United States Patent
Rebik

(10) Patent No.: US 6,644,131 B2
(45) Date of Patent: Nov. 11, 2003

(54) STEAM TRAP INSTRUMENT MODULE

(75) Inventor: Timothy Ray Rebik, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 09/982,760

(22) Filed: Oct. 18, 2001

(65) Prior Publication Data

US 2003/0074981 A1 Apr. 24, 2003

(51) Int. Cl.⁷ ............................... G01F 1/22; F16T 1/20
(52) U.S. Cl. ...................... 73/861.57; 137/185
(58) Field of Search ................ 374/39; 73/861.57; 137/185, 192, 1; 236/52, 55, 94

(56) References Cited

U.S. PATENT DOCUMENTS

| | | | |
|---|---|---|---|
| 4,249,697 A | * 2/1981 | Savage, Jr. | 374/112 |
| 4,308,889 A | 1/1982 | Lin et al. | 137/187 |
| 4,445,343 A | 5/1984 | McCarty | 62/324.1 |
| 4,456,173 A | 6/1984 | Miner et al. | 237/67 |
| 4,623,091 A | * 11/1986 | Stein | 137/192 |
| 4,630,633 A | 12/1986 | Vallery | 137/185 |
| 4,705,212 A | 11/1987 | Miller et al. | 236/54 |
| 4,727,750 A | 3/1988 | Yonemura | 73/40 |
| 4,746,223 A | 5/1988 | Miyata et al. | 374/103 |
| 4,764,024 A | 8/1988 | Ryan | 374/39 |
| 5,023,549 A | * 6/1991 | Dau et al. | 324/220 |
| 5,992,436 A | * 11/1999 | Hellman et al. | 137/1 |

FOREIGN PATENT DOCUMENTS

| | | |
|---|---|---|
| EP | 0 972 982 A2 | 7/1999 |
| GB | 2 231 407 A | 11/1990 |
| WO | WO 89/05938 | 6/1989 |
| WO | WO 99/39129 | 8/1999 |

OTHER PUBLICATIONS

Spiral Sarco® SPIRA–tec® Steam Loss Detector System Type 30; Brochure; 10 pages; 1994.

TrapMan® TM5/TrapManager™ Computerized Steam Trap Management system for Productive Maintenance; Brochure; 4 pages; 1998.

* cited by examiner

*Primary Examiner*—Harshad Patel
(74) *Attorney, Agent, or Firm*—Marshall, Gerstein & Borun LLP

(57) ABSTRACT

A steam trap system is disclosed. The steam trap system includes an inlet, an outlet, and a float, with the inlet and the outlet separated by an orifice. The steam trap includes a plug operatively coupled to the float and disposed adjacent the orifice and arranged to open and close the orifice in response to movement of the float. A instrument module includes a pressure transducer arranged to detect pressure in the steam trap, a temperature transducer arranged to detect temperature within the steam trap, and an eddy current probe arranged to detect movement of the plug. A central processing unit is operatively coupled to and arranged to receive an output from each of the pressure transducer, the temperature transducer, and the eddy current probe, the central processing unit arranged to process the respective outputs to thereby determine total steam flow and total condensate flow through the steam trap.

20 Claims, 3 Drawing Sheets

STEAM TRAP INSTRUMENT MODULE

FIELD OF THE INVENTION

The present invention relates generally to steam traps and, more specifically, to an instrument module for use with a steam trap that measures, for example, total steam flow and/or total condensate flow through a steam trap, and which further may be used to detect failure of the steam trap.

BACKGROUND OF THE INVENTION

Steam traps for use on process steam systems are generally well known in the art. It is equally well known that many steam traps are prone to failure. When a steam trap fails in a closed position, condensate is trapped within the system, thus causing the outlet temperature of a process fluid to drop. Such temperature decreases are easy to monitor and detect, and thus it is relatively easy to detect when a steam trap has failed in the closed position.

However, it generally is not as easy to detect when a steam trap has failed in an open position. When a steam trap fails in the open position, live steam can be vented directly to the atmosphere through vent piping. The efficiency of the system may drop quickly, but the failure is generally not easy to detect based on variations in typical system parameters. Many such steam traps may be located in remote or difficult to access locations, and therefore may not be detected for some time. All the while, a failed steam trap venting live steam may negatively impact the overall operating efficiency of the process system.

DETAILED DESCRIPTION OF THE DISCLOSED EMBODIMENT

The example described herein is not intended to be exhaustive or to limit the scope of the invention to the precise form or forms disclosed. Rather, the following exemplary embodiment has been chosen and described in order to best explain the principles of the invention and to enable others skilled in the art to follow the teachings thereof.

Figure 1:
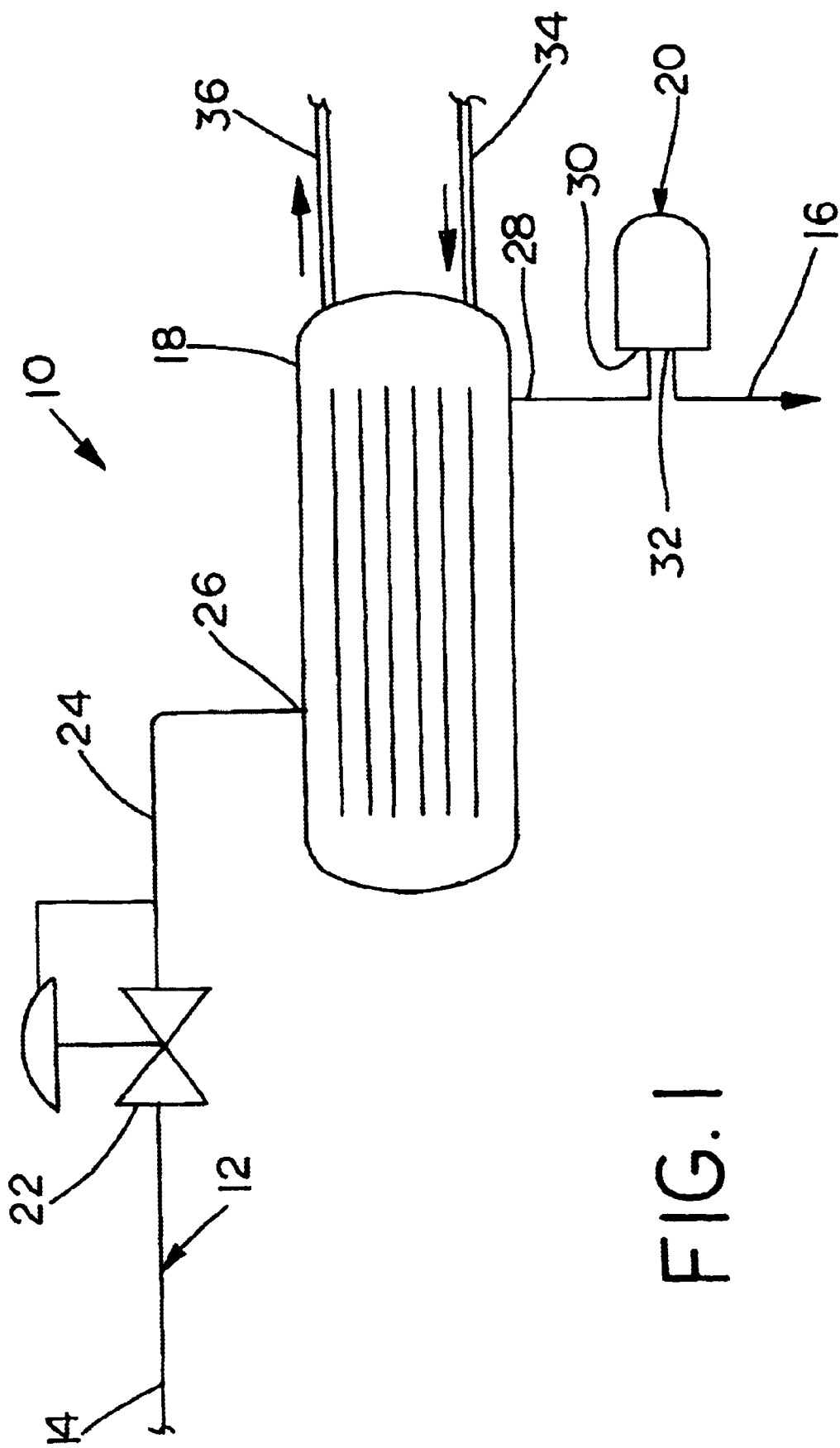
FIG. 1 is a fragmentary schematic diagram of a process steam heating system.

Referring now to the drawings, FIG. 1 is a schematic representation of a conventional process steam system 10 having a steam line 12. The steam line 12 includes an inlet end 14 and an outlet or condensate return 16. The process steam system 10 includes a device requiring process steam, which in the disclosed example is a heat exchanger 18. The steam system 10 would typically include a number of other components (not shown) of the type typically found on steam systems. Such typical components and the operation thereof would be known to those of skill in the art and thus need not be discussed further. It will be understood that the heat exchanger 18 is discussed herein for purposes of illustration only and is not intended to limit the scope of the invention described herein. The steam system 10 may well employ a different device trap of instead of a heat exchanger 18. The steam system 10 includes a steam trap assembled in accordance with the teachings of the present invention and which is generally referred to by the reference numeral 20.

The steam system 10 includes a control valve 22 of the type commonly employed in the art, and a supply pipe 24 leading from the control valve 22 to an inlet 26 of the heat exchanger 18. An outlet pipe 28 leads from the heat exchanger 18 to in inlet 30 on the steam trap 20, and an outlet 32 on the steam trap 20 leads to the condensate return 16. The heat exchanger 18 typically includes a cold water inlet 34 and a hot water outlet 36 as would be known. It will be understood that, instead of water, the system 10 may use any other suitable process fluid as would be known. However, for convenience of explanation the following description will refer only to water, it being understood that the teachings herein are equally applicable to a process system employing other suitable fluids.

Figure 2:
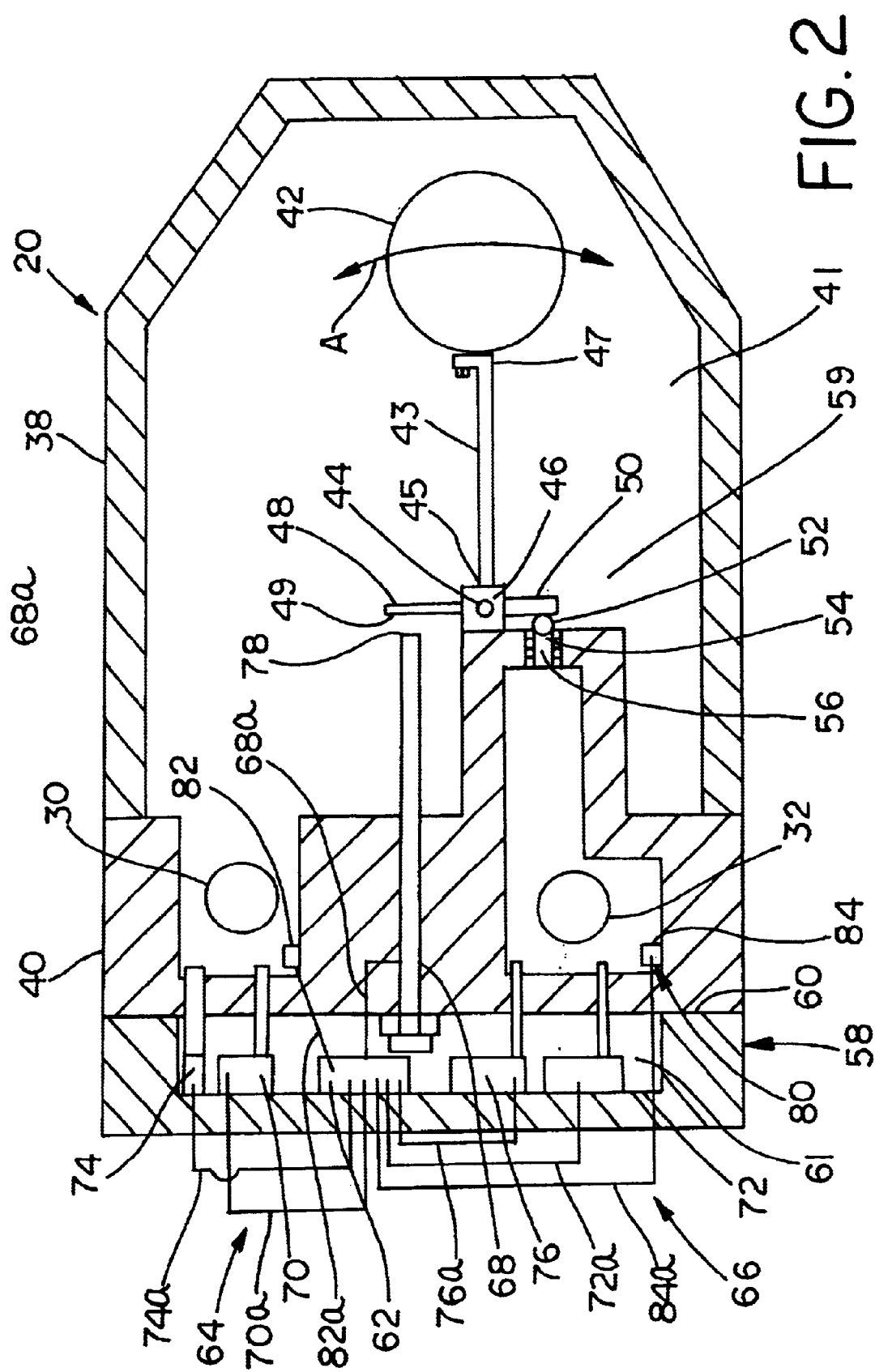
FIG. 2 is an enlarged cross-sectional view of a steam trap having a flow control module assembled in accordance with the teachings of the invention.

Referring now to FIG. 2, the steam trap 20 includes a body 38 and a cover 40. The body 38 and the cover 40 may be joined to each other in a conventional manner and are preferably separable from each other. The body 38 and the cover 40 cooperate to define a reservoir 41. A float 42 is disposed inside of the steam trap 20 and is mounted by a pivot 44 to a mounting portion 46. Accordingly, the float 42 is free to travel up and down along a generally arcuate path as indicated by the reference arrow A. It will also be appreciated that the float 42 will generally travel along the path A in response to the presence of, absence of, or changes in the level of fluid inside the steam trap 20. As an alternative, it is conceivable that the float may otherwise be shiftable or slideable, such as, for example, along a generally linear path.

In the example shown the float 42 is connected to an arm 43 having an outer end 45 and an inner end 47. The inner end 45 is mounted to the pivot 44. A pair of arms 48, 50 are mounted to the inner end 45 of the arm 43. The arm 48 extends generally upwardly from the pivot 44 to form a target 49, while the arm 50 extends generally downwardly from the pivot 44. A plug 52 is mounted to or otherwise carried by the lower arm 50. An orifice 54 is defined inside of the steam trap 20 and provides a passage 56 between the outlet 32 and an interior 59 of the body 38. It will be appreciated that the plug 52 will close the orifice 54 when the float 42 drops (e.g., when there is no fluid or only minimal fluid within the body 38 of the steam trap 20). It will also be appreciated that the plug 52 will move away from and thus open the orifice 54 when the float 42 moves upwardly (e.g., when a sufficient amount of fluid gathers in the body 38 of the steam trap 20). Finally, the orifice 54 will have known dimensions.

An instrument module 58 is attached to the steam trap 20. The instrument module 58 may be mounted to a mounting portion 60 of the cover 40, or to any other suitably prepared surface or area. Preferably, a space 61 is provided between the instrument module 58 and the balance of the steam trap 20 in order to prevent or lessen possible overheating of the instrument module 58. The instrument module 58 includes a central processing unit or CPU 62. The CPU 62 may be any one of a number of commercially available processing units. The instrument module 58 includes a pressure sensing system 64, a temperature sensing system 66, and an eddy current probe 68.

The pressure sensing system 64 may include a pair of pressure transducers 70, 72. The pressure transducer 70 may be disposed generally adjacent to the inlet 30, while the pressure transducer 72 may be disposed generally adjacent to the outlet 32. The temperature sensing system may include a pair of temperature transducers 74, 76. The temperature transducer 74 may be disposed generally adjacent to the inlet 30, while the temperature transducer 76 may be disposed generally adjacent to the outlet 32.

The eddy current probe 68 includes an end 78 which is disposed generally adjacent to the arm 48. Accordingly, movement of the float 42 causes a corresponding movement of the arm 48, which is sensed by the eddy current probe as will be explained in greater detail below. Each of the eddy current probe 68, the pressure transducers 70, 72, and the temperature transducers 74, 76 are operatively connected to the CPU 62 in a conventional manner.

The steam trap 20 may also include a phase sensing system 80, which may include a pair of phase sensors 82, 84. The phase sensor 82 may be disposed generally adjacent to the inlet 30, while the phase sensor 84 may be disposed generally adjacent to the outlet 32. The phase sensors 82, 84 are operatively connected to the CPU 62 in a conventional manner. The phase sensors 82, 84 may be, for example, any one of a number of commercially available conductivity probes.

Each of the pressure transducers 70, 72 may be commercially available pressure transducers. However, the size of the pressure transducers may be a consideration depending on the size of the steam trap 20. Suitable pressure transducers are available from Rosemount, Inc., of Chanhassen, Minn. It will be appreciated that other types of pressure sensing devices may be suitable. Similarly, each of the temperature transducers 74, 76 may be commercially available temperature transducers, such as may be available from Rosemount, Inc. Again, other types of temperature sensing devices may be suitable. A suitable eddy current probe 68 is available from Bently Nevada Corporation.

In operation, the process steam system 10 works in a conventional manner. Steam from a steam source (not shown) is routed toward the heat exchanger 18 or other device in a conventional manner through the steam line 12. The steam enters the heat exchanger at the inlet 26. Inside the heat exchanger, the heat from the steam is used to heat cold water entering the heat exchanger 18 through the cold water inlet 34. Heated water exits the heat exchanger 18 via the hot water outlet 36, and may ultimately be used for heating or other purposes as would be known. The operation of the heat exchanger is conventional and would be known.

During the heat exchange process, at least a portion of the steam will be condensed to form a condensate as the steam loses heat and changes phase back into a liquid. This condensate, after passing through the steam trap 20, will be returned to the steam system 10 via the condensate return 16 in a conventional manner.

As shown in FIG. 2, steam or condensate, or some combination thereof, will enter the steam trap 20 via the inlet 30. The position of the float 42 will depend on the level of liquid or condensate inside the steam trap 20. Thus, as condensate builds within the steam trap, the float will rise, thus moving the plug 52 away from the orifice 54 and allowing condensate within the body 38 of the steam trap 20 to flow out the outlet 32 to the condensate return 16.

The eddy current probe 68 produces an output 68a which is routed to the CPU 62. The pressure transducers 70, 72 each produce an output 70a, 72a, respectively, which are routed to the CPU 62. Similarly, the temperature transducers 74, 76 each produce an output 74a, 76a, respectively, which are routed to the CPU 62. Finally, the phase sensors 82, 84 (if provided) each produce an output 82a, 84a, respectively, which are routed to the CPU 62.

For a variety of reasons, it may be desirable to measure the total flow of condensate (during normal operation) or steam (during a steam trap failure condition) flowing through the steam trap 20. If the steam trap has failed open, the eddy current probe will be able to detect the position of the plug 52 relative to the orifice 54. This is due to the fact that the movement of the target 49 on the arm 48 is indicative of the movement of the plug 52 away from the orifice 54, due to the fact that the dimensions of the arms 48, 50 are known. Also, because the dimensions of the plug 52 and the orifice 54 are known, the cross-sectional area of the passage 56 would be known.

Figure 3:
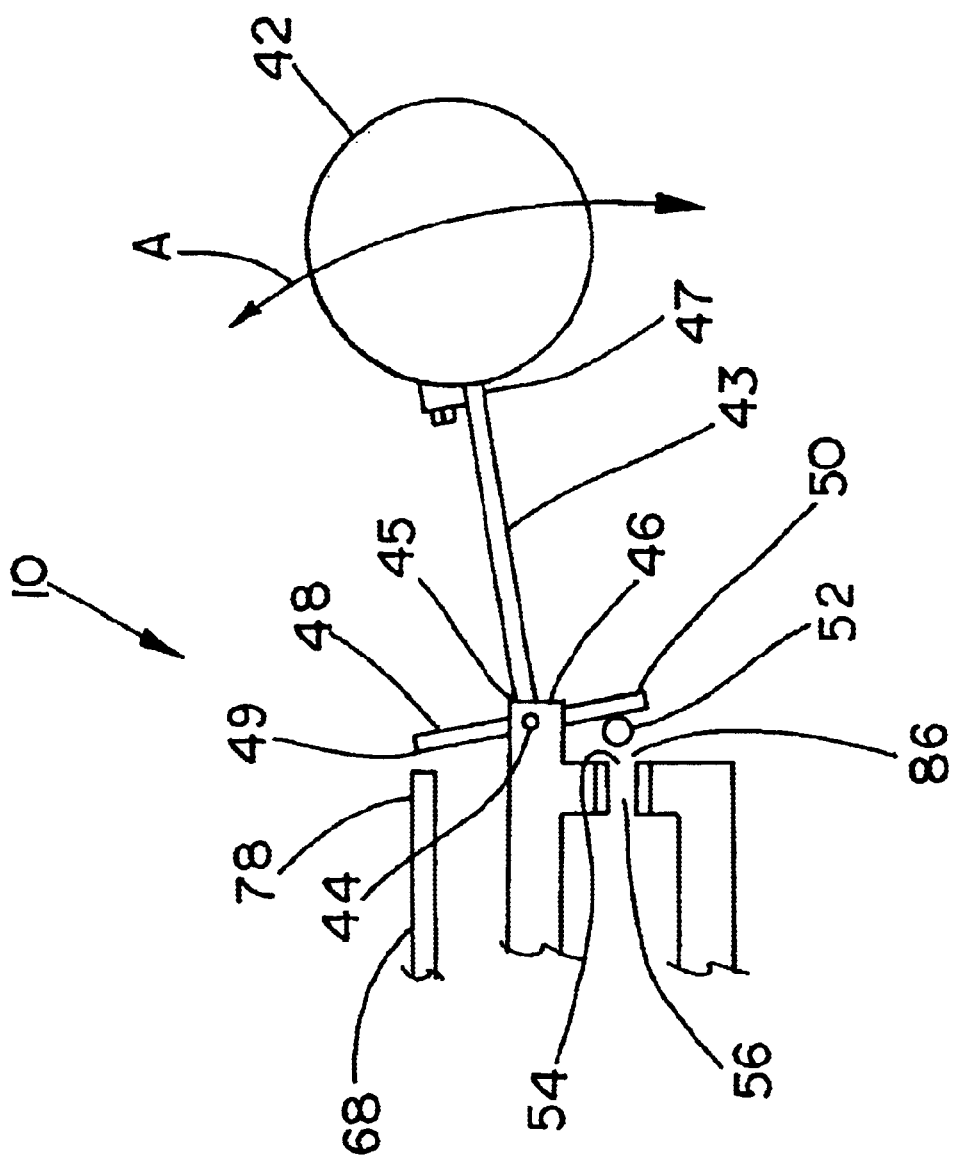
FIG. 3 is an enlarged fragmentary view illustrating the relationship between the plug and the orifice leading to the condensate return.

For example, referring now to FIG. 3, in the event the plug 52 is very close to the orifice 54, then the condensate or steam will flow along a generally annular path 86 past the plug 52 and into the orifice 54. In the event the plug 52 is very close to the orifice 54, the total cross-sectional area of the annular path 86 (commonly referred to as the "annular area") will be relatively small. On the other hand, in the event the plug 52 is further away from the orifice 54, the total cross-sectional area of the path 86 will be relatively larger. Because the dimensions of the orifice and the plug are known, and because the location of the plug 52 relative to the orifice 54 can be determined via the output 68a from the eddy current probe 68, the total cross-sectional area of the path 86 can be calculated using known geometric principles. It will be understood that the total cross-sectional area of the path 86 will increase as the plug 52 travels away from the orifice 54 as the float 42 rises in response to additional condensate in the reservoir 41. On the other hand, it will be understood that the total cross-sectional area of the path 86 will decrease as the plug 52 travels toward the orifice 54 as the float 42 is lowered in response to less condensate or the absence of condensate in the reservoir 41. When the plug 52 is disposed as shown in FIG. 2, it will be appreciated that the total cross-sectional area of the path 86 will be zero due to the fact that the plug 52 is seated against the orifice 54.

Using the respective outputs from the pressure sensing system 64, the temperature sensing system 66, the eddy current probe 68, and the phase sensing system 80, the CPU can determine the total flow of condensate and/or steam flowing through the orifice using well known engineering principles, such as, for example, by using ASME water and steam tables along with general thermodynamic and fluid dynamic principles, all of which are readily available and known to those of skill in the art and which may be readily programmed into or otherwise available to the CPU 62. Thus, based on the outputs received from the various temperature, pressure, and phase sensing systems, and based on the known dimensions of the annular path 86, the CPU 62 can readily calculate the total condensate flow through the steam trap 20 during normal operations, or the total steam flow through the steam trap 20 in the even that the steam trap 20 has failed in an open condition.

By way of further explanation of an exemplary mode of operation, the pressure at the inlet 30 is sensed by the pressure transducer 70, and the pressure at the outlet 32 is sensed by the pressure transducer 72 at the outlet 32. The respective outputs 70a and 72a are routed to the CPU 62. The temperature at the inlet 30 is sensed by the temperature transducer 74, with the output 74a routed to the CPU 62. The travel of the plug 52 is determined by the eddy current probe 68, with the output 68a thereof also routed to the CPU 62. The CPU process the various outputs, and using the aforementioned look up tables, calculates total flow through the steam trap 20.

In the event that the float mechanism has failed in the open position, steam will flow through the steam trap 20, as all of the condensate will drain through the condensate return 16 until live steam flows through the steam trap 20. The temperature and pressure values processed by the CPU will then be indicative of trap failure, and the CPU will then calculate total steam loss through the steam trap 20.

In the event the float mechanism has failed in the closed position (e.g., with the plug 52 blocking the orifice 54), condensate will flood the reservoir 41 of the steam trap 20. Again, readings from the pressure, temperature, and phase sensors will be indicative of the presence of water or fluid in the steam trap.

Those skilled in the art will appreciate that, although the teachings of the invention have been illustrated in connection with certain exemplary embodiments, there is no intent to limit the invention to the disclosed example. Instead, the intention of this application is to cover all modifications and embodiments fairly falling within the scope of the appended claims either literally or under the doctrine of equivalents.

What is claimed:

1. A steam trap system comprising:
   a steam trap, the steam trap including an inlet, an outlet, and a float, the inlet and the outlet separated by an orifice, the steam trap further including a plug operatively coupled to the float, the plug disposed adjacent the orifice and arranged to open and close the orifice in response to movement of the float;
   an instrument module mounted to the steam trap, the instrument module including a central processing unit operatively coupled to each of an inlet pressure transducer, an outlet pressure transducer, a temperature transducer, and an eddy current probe;
   the inlet pressure transducer positioned to detect pressure at the steam trap inlet;
   the outlet pressure transducer positioned to detect pressure at the steam trap outlet;
   the temperature transducer positioned to detect temperature within the steam trap;
   the eddy current probe positioned to detect movement of the plug; and
   the central processing unit receiving an output from each of the inlet pressure transducer, the outlet pressure transducer, the temperature transducer, and the eddy current probe, the central processing unit arranged to determine total steam flow and total condensate flow through the steam trap.

2. The steam trap system of claim 1, wherein the temperature transducer disposed adjacent the steam trap outlet.

3. The steam trap system of claim 2, including a second temperature transducer disposed adjacent the steam trap inlet, the central processing unit operatively coupled to and receiving an output from the second temperature transducer.

4. The steam trap system of claim 1, wherein the temperature transducer is disposed adjacent the steam trap inlet.

5. The steam trap system of claim 1, wherein the float is mounted to a pivot arm, and including a target mounted to the pivot arm, the pivot arm and the target moveable along with the float, and wherein the eddy current probe is positioned to be responsive to movement of the target.

6. The steam trap of claim 1, including a phase sensor disposed within the steam trap.

7. The steam trap of claim 1, including a phase sensor disposed within the steam trap, the phase sensor arranged to detect condensate at the inlet and at the outlet of the steam trap.

8. A steam trap system comprising:
   a steam trap, the steam trap including an inlet, an outlet, and a float, the inlet and the outlet separated by an orifice, the steam trap further including a plug operatively coupled to the float, the plug disposed adjacent the orifice and arranged to open and close the orifice in response to movement of the float;
   a instrument module, the instrument module including an inlet pressure transducer, arranged to detect pressure at the steam trap inlet, an outlet pressure transducer arranged to detect pressure at the steam trap outlet, a temperature transducer arranged to detect temperature within the steam trap, and an eddy current probe arranged to detect movement of the plug; and
   a central processing unit operatively coupled to and arranged to receive an output from each of the inlet pressure transducer, the outlet pressure transducer, the temperature transducer, and the eddy current probe, the central processing unit arranged to process the respective outputs to thereby determine total steam flow and total condensate flow through the steam trap.

9. The steam trap system of claim 8, wherein the temperature sensor is disposed adjacent the steam trap outlet.

10. The steam trap system of claim 9, including a second temperature sensor disposed adjacent the steam trap inlet, the central processing unit operatively coupled to and receiving an output from the second temperature sensor.

11. The steam trap system of claim 8, wherein the temperature sensor is disposed adjacent the steam trap inlet.

12. The steam trap system of claim 8, wherein the float is mounted to a pivot arm, and including a target mounted to the pivot arm, the pivot arm and the target moveable along with the float, and wherein the eddy current probe is positioned to be responsive to movement of the target.

13. The steam trap of claim 8, including a phase sensor disposed within the steam trap and operatively coupled to the central processing unit.

14. The steam trap of claim 8, including a target mounted to the float, the target positioned adjacent the eddy current probe.

15. The steam trap of claim 8, wherein the instrument module is contained in a housing, the housing removably attachable to the steam trap.

16. A steam trap system comprising:
   a steam trap, the steam trap including an inlet, an outlet, and a float, the inlet and the outlet separated by an orifice, the steam trap further including a plug operatively coupled to the float, the plug disposed adjacent the orifice and arranged to open and close the orifice in response to movement of the float;
   a instrument module, the instrument module including a pressure transducer arranged to detect pressure in the steam trap, a temperature transducer arranged to detect temperature within the steam trap, an eddy current probe arranged to detect movement of the plug, and a phase sensor arranged to detect phase within the steam trap; and
   a central processing unit operatively coupled to and arranged to receive an output from each of the pressure transducer, the eddy current probe, and the phase sensor, the central processing unit arranged to process the respective outputs to thereby determine total steam flow and total condensate flow through the steam trap.

17. The steam trap system of claim 16, wherein the pressure transducer is arranged to detect pressure adjacent the inlet and adjacent the outlet.

18. The steam trap system of claim 16, wherein the temperature transducer is arranged to detect temperature adjacent the inlet and adjacent the outlet.

19. A steam trap system comprising:

a steam trap, the steam trap including an inlet, an outlet, and a float, the inlet and the outlet separated by an orifice, the steam trap further including a plug operatively coupled to the float, the plug disposed adjacent the orifice and arranged to open and close the orifice in response to movement of the float;

a instrument module, the instrument module including a pressure transducer arranged to detect pressure in the steam trap, a temperature transducer arranged to detect temperature within the steam trap, and an eddy current probe arranged to detect movement of the plug; and a central processing unit operatively coupled to and arranged to receive an output from each of the pressure transducer, the temperature transducer, and the eddy current probe, the central processing unit arranged to process the respective outputs to thereby determine total steam flow and total condensate flow through the steam trap.

20. The steam trap system of claim 19, wherein the pressure transducer is arranged to detect pressure adjacent the inlet and adjacent the outlet, the temperature transducer is arranged to detect temperature adjacent the inlet and adjacent the outlet, and including a phase sensor arranged to detect phase inside the steam trap changes, the phase sensor operatively connected to the central processing unit.

* * * * *

UNITED STATES PATENT AND TRADEMARK OFFICE
CERTIFICATE OF CORRECTION

PATENT NO. : 6,644,131 B2
DATED : November 11, 2003
INVENTOR(S) : Timothy R. Rebik It is certified that error appears in the above-identified patent and that said Letters Patent is hereby corrected as shown below:

Drawings,
Figure 2, please delete reference numeral "68a" (having no lead line).

Column 2,
Line 8, please delete "to in inlet" and insert instead -- to an inlet --.

Column 4,
Line 52, please delete "in the even" and insert instead -- in the event --.

Column 5,
Line 47, please delete "transducer disposed" and insert instead -- transducer is disposed --.

Signed and Sealed this

Twenty-seventh Day of July, 2004

JON W. DUDAS
*Acting Director of the United States Patent and Trademark Office*